(12) United States Patent
Raaf

(10) Patent No.: US 6,675,025 B1
(45) Date of Patent: Jan. 6, 2004

(54) METHOD FOR ESTABLISHING TELECOMMUNICATIONS LINKS AND SWITCHING SYSTEM

(75) Inventor: Bernhard Raaf, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/398,687

(22) Filed: Sep. 20, 1999

Related U.S. Application Data

(63) Continuation of application No. PCT/DE98/00648, filed on Mar. 4, 1998.

(30) Foreign Application Priority Data

Mar. 19, 1997 (DE) .......................................... 197 11 524

(51) Int. Cl.$^7$ ................................................. H04Q 7/20
(52) U.S. Cl. .................... 455/561; 455/450; 455/452.2; 455/343.4; 370/337; 370/347; 375/132
(58) Field of Search ................................. 455/450, 442, 455/517, 451, 452, 453, 454, 561, 103, 452.1, 452.2, 343.4; 370/441, 342, 337, 347; 375/132, 138

(56) References Cited

U.S. PATENT DOCUMENTS

| | | | |
|---|---|---|---|
| 4,573,209 A | | 2/1986 | Deman et al. |
| 4,761,778 A | * | 8/1988 | Hui .............................. 370/441 |
| 5,425,049 A | * | 6/1995 | Dent ............................ 375/132 |
| 5,430,713 A | | 7/1995 | Gupta et al. |
| 5,859,841 A | * | 1/1999 | Gitlits ..................... 370/330 X |
| 6,128,327 A | * | 10/2000 | Bird et al. .............. 455/450 X |

OTHER PUBLICATIONS

"Interference Diversity Gain in Frequency Hopping GSM", Hakan Oloffson et al., Jul. 25, 1995, pp. 102–106.
International Published Application No. 96/07284 (Gitlits), dated Mar. 7, 1996.

* cited by examiner

*Primary Examiner*—Nay Maung
*Assistant Examiner*—Philip J. Sobutka
(74) *Attorney, Agent, or Firm*—Laurence A. Greenberg; Werner H. Stemer; Ralph E. Locher

(57) ABSTRACT

A method for establishing telecommunications links in a switching system includes the steps of providing terminal devices and a base station having transmitting/receiving devices. The number of terminal devices is greater than the number of transmitting/receiving devices. A transmission of useful information and/or signaling information is performed between a transmitting/receiving device and a given terminal device in a first transmission cycle. The transmission between the transmitting/receiving device and the given terminal device is subsequently interrupted for a given time period. The given time period lasts as long as a transmission period of at least one transmission frequency. The transmission between the transmitting/receiving device and the given terminal device is continued in a second transmission cycle in time after the given time period has elapsed. A switching system is also provided.

17 Claims, 8 Drawing Sheets

| Transceiver | Frequency | Destination Mobile Station MS x = f(i)   x = 11, ..., 15; 21, ..., 27 | | | | | | | |
|---|---|---|---|---|---|---|---|---|---|
| | | $T_1$ | $T_2$ | $T_3$ | $T_4$ | $T_5$ | $T_6$ | $T_7$ | $T_8$ |
| TR11 | f1 | MS11 | MS15 | MS14 | MS13 | MS12 | MS11 | MS15 | MS14 |
| TR12 | f2 | MS12 | MS11 | MS15 | MS14 | MS13 | MS12 | MS11 | MS15 |
| TR13 | f3 | MS13 | MS12 | MS11 | MS15 | MS14 | MS13 | MS12 | MS11 |
| TR14 | f4 | MS14 | MS13 | MS12 | MS11 | MS15 | MS14 | MS13 | MS12 |
| TR21 | f6 | MS21 | MS27 | MS26 | MS25 | MS24 | MS23 | MS22 | MS21 |
| TR22 | f7 | MS22 | MS21 | MS27 | MS26 | MS25 | MS24 | MS23 | MS22 |
| TR23 | f8 | MS23 | MS22 | MS21 | MS27 | MS26 | MS25 | MS24 | MS23 |
| TR24 | f9 | MS24 | MS23 | MS22 | MS21 | MS27 | MS26 | MS25 | MS24 |
| TR25 | f10 | MS25 | MS24 | MS23 | MS22 | MS21 | MS27 | MS26 | MS25 |

FIG. 2A

| Destination Station MS x | Frequency f / Originating Transceiver TR = f(T) | | | | | | | |
|---|---|---|---|---|---|---|---|---|
| | $T_1$ | $T_2$ | $T_3$ | $T_4$ | $T_5$ | $T_6$ | $T_7$ | $T_8$ |
| MS11 | f1/TR11 | f2/TR12 | f3/TR13 | f4/TR14 | (f5) - | f1/TR11 | f2/TR12 | f3/TR13 |
| MS12 | f2/TR12 | f3/TR13 | f4/TR14 | (f5) - | f1/TR11 | f2/TR12 | f3/TR13 | f4/TR14 |
| MS13 | f3/TR13 | f4/TR14 | (f5) - | f1/TR11 | f2/TR12 | f3/TR13 | f4/TR14 | (f5) - |
| MS14 | f4/TR14 | (f5) - | f1/TR11 | f2/TR12 | f3/TR13 | f4/TR14 | (f5) - | f1/TR11 |
| MS15 | (f5) - | f1/TR11 | f2/TR12 | f3/TR13 | f4/TR14 | (f5) - | f1/TR11 | f2/TR12 |
| MS21 | f6/TR21 | f7/TR22 | f8/TR23 | f9/TR24 | f10/TR25 | (f11) - | (f5) - | f6/TR21 |
| MS22 | f7/TR22 | f8/TR23 | f9/TR24 | f10/TR25 | (f11) - | (f5) - | f6/TR21 | f7/TR22 |
| MS23 | f8/TR23 | f9/TR24 | f10/TR25 | (f11) - | (f5) - | f6/TR21 | f7/TR22 | f8/TR23 |
| MS24 | f9/TR24 | f10/TR25 | (f11) - | (f5) - | f6/TR21 | f7/TR22 | f8/TR23 | f9/TR24 |
| MS25 | f10/TR25 | (f11) - | (f5) - | f6/TR21 | f7/TR22 | f8/TR23 | f9/TR24 | f10/TR25 |
| MS26 | (f11) - | (f5) - | f6/TR21 | f7/TR22 | f8/TR23 | f9/TR24 | f10/TR25 | (f11) - |
| MS27 | (f5) - | f6/TR21 | f7/TR22 | f8/TR23 | f9/TR24 | f10/TR25 | (f11) - | (f5) - |

FIG. 2B

| Transceiver | Frequency | Frequency and Destination Mobile Station MS x = f(i)  x = 11, ..., 15; 21, ..., 27 | | | | | | | |
|---|---|---|---|---|---|---|---|---|---|
| | | $T_1$ | $T_2$ | $T_3$ | $T_4$ | $T_5$ | $T_6$ | $T_7$ | $T_8$ |
| TR11 | f1, f6 | f1, MS11 | f6, MS15 | f6, MS14 | f6, MS13 | f6, MS12 | f6, MS11 | f1, MS15 | f1, MS14 |
| TR12 | f2, f7 | f2, MS12 | f2, MS11 | f7, MS15 | f7, MS14 | f7, MS13 | f7, MS12 | f7, MS11 | f2, MS15 |
| TR13 | f3, f8 | f3, MS13 | f3, MS12 | f3, MS11 | f8, MS15 | f8, MS14 | f8, MS13 | f8, MS12 | f3, MS11 |
| TR14 | f4, f9 | f4, MS14 | f4, MS13 | f4, MS12 | f4, MS11 | f9, MS15 | f9, MS14 | f9, MS13 | f9, MS12 |
| TR21 | f6, f11 | f11, MS21 | f18, MS27 | f18, MS26 | f18, MS25 | f18, MS24 | f18, MS23 | f18, MS22 | f18, MS21 |
| TR22 | f7, f12 | f12, MS22 | f12, MS21 | f19, MS27 | f19, MS26 | f19, MS25 | f19, MS24 | f19, MS23 | f19, MS22 |
| TR23 | f8, f13 | f13, MS23 | f13, MS22 | f13, MS21 | f20, MS27 | f20, MS26 | f20, MS25 | f20, MS24 | f20, MS23 |
| TR24 | f9, f14 | f14, MS24 | f14, MS23 | f14, MS22 | f14, MS21 | f21, MS27 | f21, MS26 | f21, MS25 | f21, MS24 |
| TR25 | f10, f15 | f15, MS25 | f15, MS24 | f15, MS23 | f15, MS22 | f15, MS21 | f22, MS27 | f22, MS26 | f22, MS25 |

FIG. 3A

| Destination Station MS x | Frequency f / Originating Transceiver TR = f(T) | | | | | | | |
|---|---|---|---|---|---|---|---|---|
| | $T_1$ | $T_2$ | $T_3$ | $T_4$ | $T_5$ | $T_6$ | $T_7$ | $T_8$ |
| MS11 | f1/TR11 | f2/TR12 | f3/TR13 | f4/TR14 | (f5) - | f6/TR11 | f7/TR12 | f8/TR13 |
| MS12 | f2/TR12 | f3/TR13 | f4/TR14 | (f5) - | f6/TR11 | f7/TR12 | f8/TR13 | f9/TR14 |
| MS13 | f3/TR13 | f4/TR14 | (f5) - | f6/TR11 | f7/TR12 | f8/TR13 | f9/TR14 | (f10) - |
| MS14 | f4/TR14 | (f5) - | f6/TR11 | f7/TR12 | f8/TR13 | f9/TR14 | (f10) - | f1/TR11 |
| MS15 | (f5) - | f6/TR11 | f7/TR12 | f8/TR13 | f9/TR14 | (f10) - | f1/TR11 | f2/TR12 |
| MS21 | f11/TR21 | f12/TR22 | f13/TR23 | f14/TR24 | f15/TR15 | (f16) - | (f17) - | f18/TR21 |
| MS22 | f12/TR22 | f13/TR23 | f14/TR24 | f15/TR25 | (f16) - | (f17) - | f18/TR21 | f19/TR22 |
| MS23 | f13/TR23 | f14/TR24 | f15/TR25 | (f16) - | (f17) - | f18/TR21 | f19/TR22 | f20/TR22 |
| MS24 | f14/TR24 | f15/TR25 | (f16) - | (f17) - | f18/TR21 | f19/TR22 | f20/TR23 | f21/TR24 |
| MS25 | f15/TR25 | (f16) - | (f17) - | f18/TR21 | f19/TR22 | f20/TR23 | f21/TR24 | f22/TR25 |
| MS26 | (f16) - | (f17) - | f18/TR21 | f19/TR22 | f20/TR23 | f21/TR24 | f22/TR25 | (f5) - |
| MS27 | (f17) - | f18/TR21 | f19/TR22 | f20/TR23 | f21/TR24 | f22/TR25 | (f5) - | ((f10) - |

FIG. 3B

PRIOR ART

FIG. 6A

| Transceiver | Frequency | Destination Mobile Station MS x = f(T)   x = 11, ..., 14 | | | | | | |
|---|---|---|---|---|---|---|---|---|
| | | $T_1$ | $T_2$ | $T_3$ | $T_4$ | $T_5$ | $T_6$ | $T_7$ |
| TR11 | f1 | MS11 | MS14 | MS13 | MS12 | MS11 | MS14 | MS13 |
| TR12 | f2 | MS12 | MS11 | MS14 | MS13 | MS12 | MS11 | MS14 |
| TR13 | f3 | MS13 | MS12 | MS11 | MS14 | MS13 | MS12 | MS11 |
| TR14 | f4 | MS14 | MS13 | MS12 | MS11 | MS14 | MS13 | MS12 |

FIG. 6B

| Destination Mobile Station MS x | Frequency f / Originating Transceiver TR = f(T) | | | | | | |
|---|---|---|---|---|---|---|---|
| | $T_1$ | $T_2$ | $T_3$ | $T_4$ | $T_5$ | $T_6$ | $T_7$ |
| MS11 | f1/TR11 | f2/TR12 | f3/TR13 | f4/TR14 | f1/TR11 | f2/TR12 | f3/TR13 |
| MS12 | f2/TR12 | f3/TR13 | f4/TR14 | f1/TR11 | f2/TR12 | f3/TR13 | f4/TR14 |
| MS13 | f3/TR13 | f4/TR14 | f1/TR11 | f2/TR12 | f3/TR13 | f4/TR14 | f1/TR11 |
| MS14 | f4/TR14 | f1/TR11 | f2/TR12 | f3/TR13 | f4/TR14 | f1/TR11 | f2/TR12 |

METHOD FOR ESTABLISHING TELECOMMUNICATIONS LINKS AND SWITCHING SYSTEM

CROSS-REFERENCE TO RELATED APPLICATION

This is a continuation of copending International Application No. PCT/DE98/00648, filed Mar. 4, 1998, which designated the United States.

BACKGROUND OF THE INVENTION

Field of the Invention

The invention relates to a method for establishing telecommunications links in a switching system, in particular in a mobile communications system, having a plurality of base stations. Each of the base stations has a plurality of transmitting/receiving devices which are assigned to a plurality of terminals. The invention further relates to a switching system for establishing telecommunications links.

Methods and switching systems for establishing telecommunications links, in particular mobile communications systems having a plurality of base stations, are known. In mobile communications systems, a base station has a plurality of transmitting/receiving devices. These transmitting/receiving devices are assigned a plurality of terminals in such a way that each of the transmitting/receiving devices transmits useful information and/or signaling information to all the terminals to which a telecommunications link is to be established or to which a telecommunications link has already been established. In this case, useful information and/or signaling information is transmitted in a time-shifted manner and at transmission frequencies which are specific to the transmitting/receiving device, between the transmitting/receiving devices of in each case one base station and associated terminals.

The prior art systems have the disadvantage that the number of terminals to which telecommunications links can be established is limited by the number of transmitting/receiving devices in a base station, and by the number of different frequencies. Thus, in the prior art systems, telecommunications links can be established at most to a number of terminals which is equal to the number of transmitting/receiving devices.

SUMMARY OF THE INVENTION

It is accordingly an object of the invention to provide a method for establishing telecommunications links and a corresponding switching system which overcome the above-mentioned disadvantages of the heretofore-known methods and systems of this general type and which provide improved transmission capabilities.

With the foregoing and other objects in view there is provided, in accordance with the invention, a method for establishing telecommunications links in a switching system, in particular in a mobile communications system. The method comprises the steps of providing a first number of terminal devices; providing a base station having a second number of transmitting/receiving devices assigned to the terminal devices, the first number being greater than the second number; transmitting a useful information and/or a signaling information at different times and using a redundant coding, from a transmitting/receiving device of the second number of transmitting/receiving devices to a given terminal device of the first number of terminal devices in a first transmission cycle in time with at least one transmission frequency of a plurality of transmission frequencies specific to the transmitting/receiving devices; subsequently interrupting a transmission from the transmitting/receiving device to the given terminal device for a time period equivalent to a transmission period of at least one of the plurality of transmission frequencies; and continuing the transmission from the transmitting/receiving device to the given terminal device in a second transmission cycle in time after the time period has elapsed.

In accordance with another mode of the invention, at least one of the useful information and the signaling information is transmitted from the transmitting/receiving devices of the base station to the terminal devices with only a part of the plurality of transmission frequencies being specific to the transmitting/receiving devices and being available to the terminal devices.

In accordance with yet another mode of the invention, at least one of the useful information and the signaling information is transmitted with at least one of the transmitting/receiving devices, the at least one of the transmitting/receiving devices using more than one transmission frequency of the plurality of transmission frequencies.

In accordance with a further mode of the invention, it is provided to transmit, with the given terminal device, at least one of the useful information and the signaling information with at least the one transmission frequency of the plurality of transmission frequencies in the time period in which the transmission from the transmitting/receiving device to the given terminal device is interrupted.

In accordance with another mode of the invention, a transmission from the given terminal device is interrupted in the time period in which the transmission from the transmitting/receiving device to the given terminal device is interrupted.

In accordance with yet another mode of the invention, a receive operation of the given terminal device is switched off in the time period in which the transmission from the transmitting/receiving device to the given terminal device is interrupted.

In accordance with another mode of the invention, there is, from at least one of the transmitting/receiving devices to the given terminal device, a transmission of information for designating at least one of the plurality of transmission frequencies to be used or not to be used by the given terminal device.

In accordance with another mode of the invention, it is provided to transmit, from at least one of the transmitting/receiving devices to the given terminal device, information for designating a time for transmitting at least one of the useful information and the signaling information with the given terminal device or information for designating a time for interrupting a transmission from the given terminal device.

In accordance with another mode of the invention, from at least one of the transmitting/receiving devices to the given terminal device, information is transmitted for designating a time at which the given terminal device is switched to receive or is switched not to receive.

In accordance with a further mode of the invention, a quality of a transmission is checked of the useful information and/or signaling information transmitted from one of the transmitting/receiving devices to one of the terminal devices; and the time period in which the transmission of at least one of the useful information and the signaling information from the transmitting/receiving device to the given terminal device is interrupted is reduced, if the quality of the transmission is less than a given threshold value.

With the objects of the invention in view there is also provided, a method for establishing telecommunications links in a switching system, in particular in a mobile communications system, which comprises the steps of selecting transmission frequencies from a range of transmission frequencies, by cyclically or pseudo-randomly assigning, in a first selection process, the transmission frequencies to different base stations, and, in a second selection process within a respective one of the base stations, cyclically or pseudo-randomly assigning the transmission frequencies to terminal devices assigned to the respective one of the base stations; and transmitting a useful information and/or a signaling information between transmitting/receiving devices of the respective one of the base stations and the terminal devices assigned to the respective one of the base stations with the selected transmission frequencies.

In accordance with another mode of the invention, the second selection process includes using different selection algorithms and preferably uncorrelated selection algorithms in the different base stations.

In accordance with yet another mode of the invention, from the transmitting/receiving devices to at least one of the terminal devices, information is transmitted for designating parameters for the first and second selection processes.

With the objects of the invention in view there is also provided, a switching system for establishing telecommunications links, comprising a first number of terminal devices; a base station having a second number of transmitting/ receiving devices assigned to the terminal devices, the first number being greater than the second number; a control unit connected to the base station and programmed to perform in combination with the base station and the terminal devices the steps of transmitting a useful information and/or a signaling information at different times and using a redundant coding, from a transmitting/receiving device of the transmitting/receiving devices to a given terminal device of the terminal devices in a first transmission cycle in time with at least one transmission frequency of a plurality of transmission frequencies specific to the transmitting/receiving devices; subsequently interrupting a transmission from the transmitting/receiving device to the given terminal device for a time period equivalent to a transmission period of at least one of the plurality of transmission frequencies; and continuing the transmission with the transmitting/receiving device to the given terminal device in a second transmission cycle in time after the time period has elapsed.

With the objects of the invention in view there is further provided, a switching system for establishing telecommunications links, comprising a plurality of base stations each of the base stations having transmitting/receiving devices; a plurality of terminal devices assigned to the base stations; a control unit connected to the base stations and programmed to perform in combination with the base stations the steps of selecting transmission frequencies from a range of transmission frequencies, by cyclically or pseudo-randomly assigning, in a first selection process, the transmission frequencies to the base stations, and, in a second selection process within a respective one of the base stations, cyclically or pseudo-randomly assigning the transmission frequencies to the terminal devices assigned to the respective one of the base stations; and transmitting a useful information and/or a signaling information between the transmitting/receiving devices of the respective one of the base stations and the terminal devices assigned to the respective one of the base stations with the selected transmission frequencies.

The invention has a number of advantages, in particular, the invention increases the number of terminals to which telecommunications links can be established from the respective base station, and from which telecommunications links can be established to the associated base station. The number of costly transmitting/receiving devices in the base stations remains unchanged, so that telecommunications links to a greater number of terminals can thus be established with the same number of transmitting/receiving devices per base station. A further advantage of the invention is that there is no need to change the specification of the base stations or of the transmitting/receiving devices. Furthermore, there is no need to change the terminals or mobile stations either.

The invention also provides, in a first selection process, for the transmission frequencies to be assigned to different base stations cyclically or pseudo-randomly, and, in a second selection process, for the transmission frequencies to be assigned to the associated terminals cyclically or pseudo-randomly within a base station. This has the advantage that a single terminal is assigned a relatively large number of frequencies, and any interference which may possibly occur is thus distributed.

Other features which are considered as characteristic for the invention are set forth in the appended claims.

Although the invention is illustrated and described herein as embodied in a method and a switching system for establishing telecommunications links, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 2a and 2b are tables which give an overview of a first structure of a transmission in a system as shown in FIG. 1;

FIGS. 3a and 3b are tables which give an overview of a second structure of a transmission in the system shown in FIG. 1;

FIGS. 6a and 6b are tables which give an overview of a transmission structure for a transmission of useful information and/or signaling information in a system as shown in FIG. 5.

DESCRIPTION OF THE PREFERRED EMBODIMENTS

Figure 5:
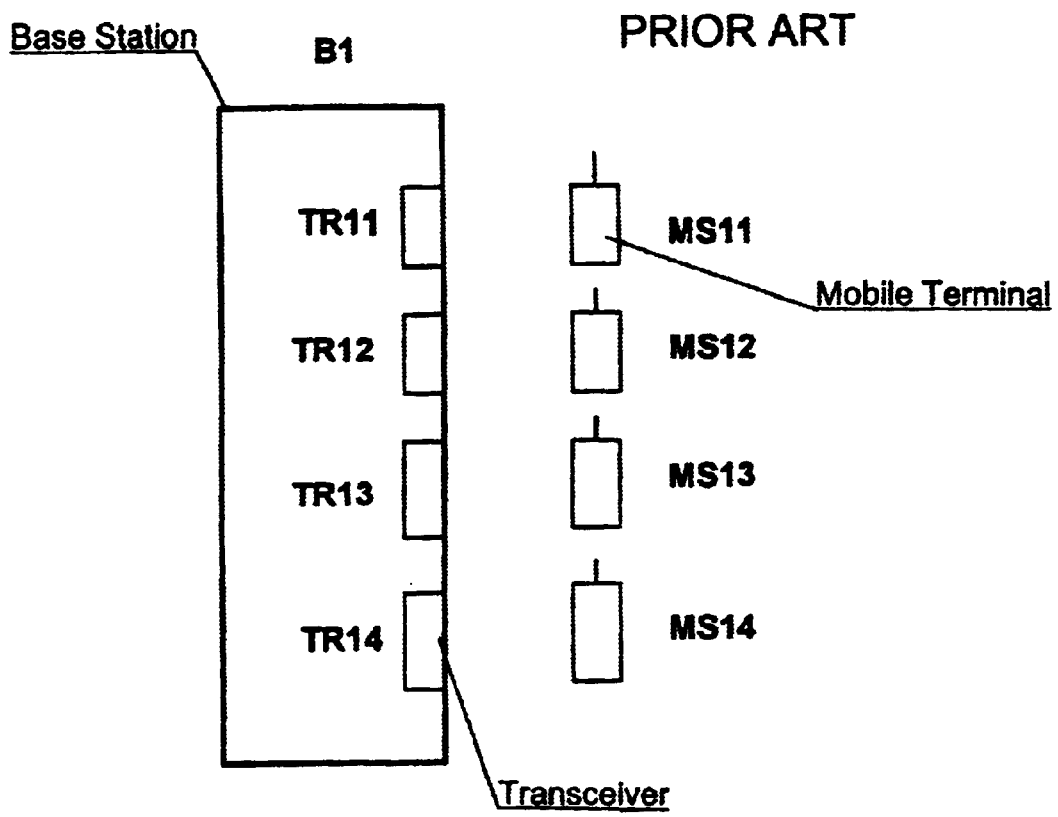
FIG. 5 is a schematic block diagram illustrating an allocation between base stations and terminals according to the prior art.

Referring now to the figures of the drawings in detail and first, particularly, to FIG. 5 thereof, there is shown a part of a prior art switching system which is, in particular, a GSM system (Global System for Mobile Communication). The switching system includes, inter alia, base stations, of which only one base station B1 is illustrated schematically. Terminals, in particular, mobile terminals are assigned to the base stations. FIG. 5 shows only the mobile terminals MS11, MS12, MS13, and MS14 which are assigned to the base station B1. The base station B1 has transmitting/receiving devices (transceivers) TR11, TR12, TR13, and TR14. In the system illustrated in FIG. 5, the number of terminals (in this case "4") assigned to one base station and to which telecommunications links can be established is equal to the number of transmitting/receiving devices in the respectively associated base station.

. . . , The associated structure for transmission of useful information and/or signaling information between the base stations and their transmitting and/or receiving devices TR and the terminals can be seen from the tables in FIGS. 6a and 6b. This shows that, for example, the transmitting and/or receiving device TR11 in the base station B1 (FIG. 5) transmits cyclically, at different times (time-shifted) and at its transmission frequency f1, useful information and/or signaling information to the associated terminals MS11, . . . MS14. The transmission is preferably made using redundant coding, as is provided in GSM systems.

A transmission is thus made by the transmitting and/or receiving device TR11 at a frequency f1 to the terminal MS11 in the time period T1, to the terminal MS14 in the time period T2, and to the terminal MS13 in the time period T3, and so forth.

The transmitting and/or receiving device TR12 likewise transmits useful information and/or signaling information at the transmission frequency f2 to the terminal MS12 in the time period T1, to the terminal MS11 in the time period T2, to the terminal MS14 in the time period T3, and so forth.

FIG. 6b shows the corresponding transmission structure between the destination mobile station and the transmitting and/or receiving device with the respectively associated transmission frequency. For example, a transmission at the transmission frequency f1 is made to the destination mobile station MS11 in the time period T1, in which case this transmission is made by the transmitting and/or receiving device TR11. In the subsequent time period T2, transmission is made to the destination mobile station MS11 at the transmission frequency f2, in which case the transmission is made by the transmitting and/or receiving device TR12.

Figure 1:
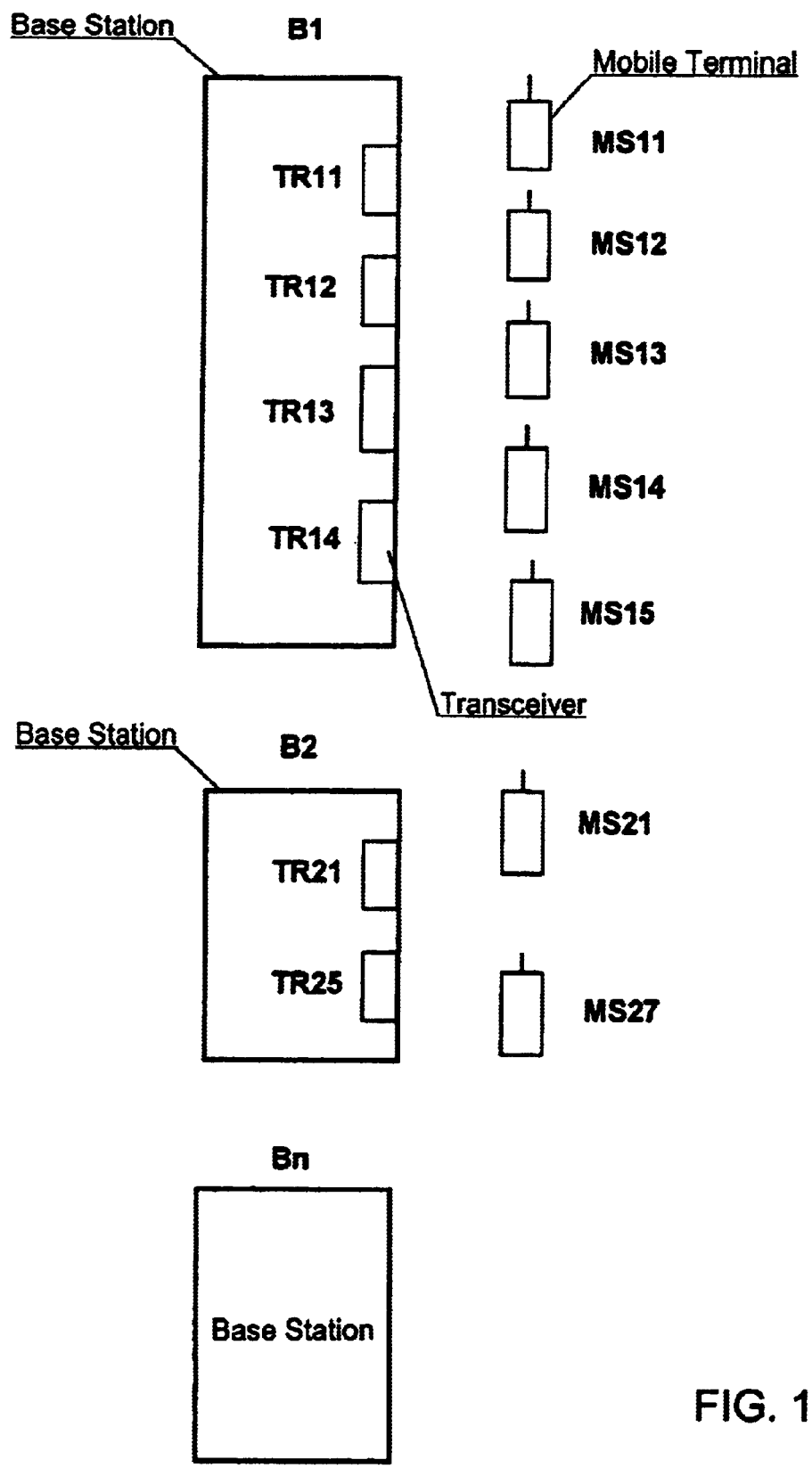
FIG. 1 is a schematic block diagram of a communications system illustrating an allocation between base stations and terminals according to an exemplary embodiment of the invention.

FIG. 1 shows an exemplary embodiment of a switching system according to the invention, which is likewise, in particular, a GSM system (Global System for Mobile Communication) and is represented only by the two base stations B1 and B2 and the associated terminals. In contrast to the prior art shown in FIGS. 5 and 6, a greater number of terminals MS are assigned to a base station, for example to base station B1, than the number of transmitting/receiving devices (transceivers) provided in this base station. The base station B1 thus has, for example, four transmitting/receiving devices TR11, TR14, while this base station B1 is assigned five terminals MS11, . . . , MS15. In the exemplary embodiment 1 illustrated in FIG. 1, the base station B2 has five transmitting/receiving devices TR21, . . . , TR25, while this base station is assigned seven terminals MS21, . . . , MS27.

The structures for transmission of useful information and/or signaling information between the base stations or their transmitting and/or receiving devices TR and the terminals in the system according to the invention can be seen from the tables in FIGS. 2a and 2b. This shows that, for example, the transmitting and/or receiving device TR11 in the base station B1 transmits useful information and/or signaling information, cyclically, at different times (time-shifted) and at its transmission frequency f1, to the associated terminals MS11, MS15, MS14, MS13, MS12. The transmitting and/or receiving device TR11 thus makes a transmission at the frequency f1 to the terminal MS11 in the time period T1, to the terminal MS15 in the time period T2, and to the terminal MS14 in the time period T3, and so forth. The transmitting and/or receiving device TR12 likewise transmits useful information and/or signaling information at the transmission frequency f2 to the terminal MS12 in the time period T1, to the terminal MS11 in the time period T2, and to the terminal MS15 in the time period T3, and so forth. The useful information and/or signaling information are transmitted using redundant coding.

FIG. 2b shows the corresponding transmission structure between the destination mobile station and the transmitting and/or receiving device, with the respectively associated transmission frequency. For example, a transmission at the transmission frequency f1 is made to the destination mobile station MS11 in the time period T1, with this transmission being made by the transmitting and/or receiving device TR11. In the subsequent time period T2, a transmission is made to the destination mobile station MS11 at the transmission frequency f2, with the transmission being made by the transmitting and/or receiving device TR12. In the subsequent time periods T3 and T4, a transmission is made to the destination mobile station MS11 at the transmission frequencies f3 and f4, respectively, with the transmission being made by the transmitting and/or receiving devices TR13 and TR14, respectively.

In the following time period T5, the base station B1 does not transmit any useful information and/or signaling information to the destination mobile station MS11. However, in this time period T5, the mobile station MS11 transmits, at a frequency f5, useful information and/or signaling information which is, however, neither evaluated by the base station B1 nor by any other base station. Furthermore, in this time period, the mobile station MS11 is switched to receive.

In the upper part of FIG. 2b, the frequency f5 at which a mobile station is in each case transmitting in predetermined time periods T1, . . . , T8 is placed in brackets ( ). However, in the illustrated exemplary embodiment, this frequency is not evaluated either by the base station B1 or by a further base station (B2).

In the time periods T6, T7 and T8, respectively, a transmission is made to the destination mobile station MS11 at the transmission frequencies f1, f2, and f3, respectively, with the transmission being made by the transmitting and/or receiving devices TR11, TR12 and TR13, respectively.

Due to the redundant coding, it is possible to reconstruct all the information, that is to say the useful information and the signaling information at the receiving side (depending on the transmission direction this can mean at the terminal end or at the transmitting and/or receiving device end, that is to say the base station end). In the system according to the invention, it is not possible to use the redundancy to compensate entirely for, for example, bit errors which occur as a result of interference during radio transmission. The limiting sensitivity of the transmission system is thus reduced. This is not critical provided the system is not operating close to this sensitivity limit.

The corresponding transmission structure for the seven terminals MS21, . . . , MS27 and the associated five transmitting and/or receiving devices TR21, . . . , TR25 is shown in the lower part of FIG. 2b.

As is shown in the upper part of FIG. 2b for the five terminals MS11–MS14 of the base station B1, a first transmission cycle comprises the time period T1 to T4. After this first transmission cycle in time, the transmission of useful information and/or signaling information by a transmitting/ receiving device to a terminal is interrupted for a time period, for example, T5, which corresponds to the transmission of useful information and/or signaling information at at least one frequency. After this time period T5, the transmission of useful information and/or signaling information by the transmitting/receiving device in the base station to the relevant terminal is continued in a second transmission cycle in time (time period T6 until the time period T9, which is not shown). The terminal MS11 considered here thus does not receive any useful information and/or signaling information in the time period T5 in the system according to the invention, and, in this time period T5, cannot transmit any useful information and/or signaling information to any of the transmitting/receiving devices in the associated base station.

As is shown in the lower part of FIG. 2b for the seven terminals MS21–MS27 of the base Station B2, a first transmission cycle comprises the time period T1 to T5. The duration of the first transmission cycle (five time periods T, in which case each time period T1–T5 corresponds to the transmission of the useful information and/or the signaling information at one frequency) is a result of the number of transmitting/receiving devices in the respective base station.

Following this first transmission cycle in time, the transmission of useful information and/or signaling information by a transmitting/receiving device to a terminal is interrupted for a time period, for example, T6 and T7, which corresponds to the transmission of useful information and/or signaling information at two frequencies.

The duration of this time period, in this case T6 and T7, results from the difference between the number (in this case: "7") of terminals MS21–MS27 and the number (in this case: "5") of transmitting/receiving devices TR21–TR225 in the respective base station B2. Instead of one relatively long "pause" (in this case: time period T6 and period T7), it is also possible to provide a plurality of short "pauses" in particular distributed uniformly over the entire period (in FIG. 2: transmission cycle with 4 time periods, for example T1 to T4 plus the time period T5, that is to say a total of 5 time periods).

In the lower part of FIG. 2b, the frequencies f5 and f11 at which a mobile station in each case transmits in predeterminable time periods T1, . . . , T8 are placed in brackets ( ). However, in the illustrated exemplary embodiment, these frequencies are not evaluated either by the base station B2 or by a further base station (B1).

Following the time period T7, the transmission of the useful information and/or signaling information by the transmitting/receiving device TR11 in the base station B2 to the relevant terminal M21 is continued in a second temporal transmission cycle (time period T8 until the time period T12 which is not shown). The transmission cycles are preferably all of equal length.

The terminal MS11 considered here thus, in the system according to the invention, does not receive any useful information and/or signaling information from the base station B1 in the time periods T6 and T7, even though it is transmitting at the frequencies f5 and f11 in these time periods T6 and T7 and/or is switched to receive. These frequencies, which are placed in brackets ( ) in the lower part of FIG. 2b, are, however, not evaluated either in the base station B2 or in a further base station (B1) in the illustrated exemplary embodiment.

The invention thus provides that telecommunications links are established between the transmitting/receiving devices of in each case one base station and associated terminals for the useful and/or signaling information at only some of the transmission frequencies (f1, f2, . . . ) which are available to the terminals and are specific to the transmitting/ receiving device: in the exemplary embodiment shown in FIG. 2a, no telecommunications links are established at the frequency f5 and, in the exemplary embodiment shown in FIG. 2b, no telecommunications links are established at the frequencies f5 and f11. In this case, the exemplary embodiment shown in FIG. 2 provides that a transmitting/receiving device is designed in such a way that it transmits useful information and/or signaling information at only one frequency.

The invention furthermore provides that at least one of the transmitting/receiving devices transmits useful information and/or signaling information at more than one transmission frequency. This is shown in FIGS. 3a and 3b. For example, the transmitting/receiving device TR11 transmits and receives at the frequencies f1 and f6 (top row in FIG. 3a), while the transmitting/receiving device TR12 transmits and receives at the frequencies f2 and f7 (FIG. 3a, second line from the top). "Dummy frequencies", that is to say frequencies at which the terminals transmit but on which frequencies no telecommunications links are established since the base stations and their transmitting/receiving devices do not evaluate these frequencies, are the frequencies f5 and f10 as well as the frequencies f16 and f17 in the exemplary embodiment shown in FIG. 3.

As has already been described, the invention can provide that a terminal (for example MS11) transmits useful information and/or signaling information at one frequency (for example f5), and/or is switched to receive, in the time period (for example T5) in which the transmission of useful information and/or signaling information by one of the transmitting/receiving devices (for example TR11, TR12, TR13, TR14; TR21, TR22, TR23, TR24, TR25) to the terminal is interrupted.

As an alternative to this, the invention can provide that the terminal (for example MS11) does not transmit any useful information and/or signaling information, and/or is not switched to receive, in the time period (for example T5) in which the transmission of useful information and/or signaling information by one of the transmitting/receiving devices (for example TR11, TR12, TR13, TR14; TR21, TR22, TR23, TR24, TR25) to the terminal is interrupted. In this context, it is possible for one of the transmitting/receiving devices (for example TR11, TR12, TR13, TR14; TR21, TR22, TR23, TR24, TR25) to transmit to the terminal information which designates transmission frequencies which are to be used and/or are not to be used by the terminal (MS11) and/or reception frequencies which are to be used and/or are not to be used.

The invention also provides that at least one transmitting/ receiving device in a base station transmits to the terminal information which designates a time at which it is intended that the terminal will or will not transmit useful information and/or signaling information and/or transmits information which designates a time at which it is intended that the terminal is switched to receive, or is not switched to receive.

Furthermore, the invention can provide that the quality of the transmission of the useful information and/or signaling information transmitted by a transmitting/receiving device to a terminal is checked and that, if a transmission quality threshold value, which can be predetermined, is not reached, the time, during which the transmission of useful information and signaling information by a transmitting/receiving device is interrupted, is shortened. In particular, the number of time periods (for example T6 and T7 in FIG. 2, MS21 row), in which the transmission of useful information and/or signaling information is interrupted, is reduced.

The invention also relates to a method for establishing telecommunications links in a switching system, in particular in a mobile communications system having a plurality of base stations B1, B2, . . . , Bn, in which case one base station (for example B1, B2) has a plurality of transmitting/receiving devices (for example TR11, TR12, TR13, TR14; TR21, TR22, TR23, TR24, TR25) which are assigned to a plurality of terminals (MS11, . . . ; MS21, . . . ). Useful information and/or signaling information are/is transmitted at transmission frequencies (f1, f2, . . . ) which are specific to the transmitting/receiving device, between the transmitting/receiving devices of in each case one base station and associated terminals, in which case the transmission frequencies are selected cyclically or pseudo-randomly from a standard range of transmission predeterminable frequencies.

Figure 4:
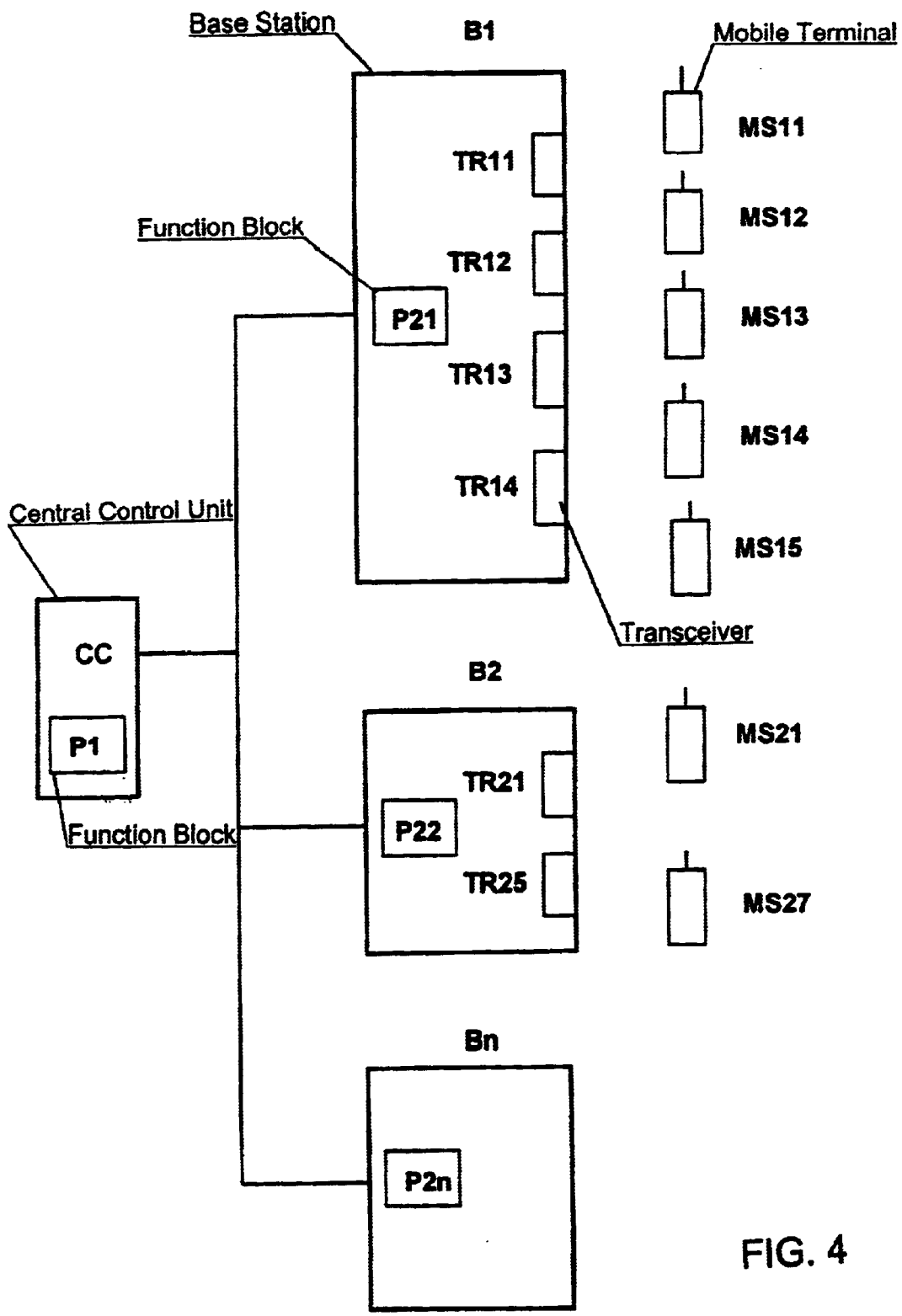
FIG. 4 is a schematic block diagram of a communications system illustrating an allocation of a plurality of base stations to one another and to terminals according to a further exemplary embodiment of the invention.

The invention provides that, in a first selection process, the transmission frequencies are assigned to different base stations cyclically or pseudo-randomly, and that, in a second selection process, the transmission frequencies are assigned to the associated terminals cyclically or pseudo-randomly within a base station. In this case, it can be provided for the features mentioned above to be combined with the method features which have been described with reference to FIGS. 1 to 3. FIG. 4 shows, schematically, the structure of a switching system in which the method mentioned above is used. This has a central control unit CC and base stations B1, B2, Bn. The first selection process or the first permutation, which is denoted by the function block P1 in FIG. 4, is carried out in the central control unit CC, while the second selection process or the second permutation, which is denoted by the function blocks P21, P22, . . . , P2n in FIG. 4, is carried out in the base stations B1, . . . . The second selection process in the illustrated exemplary embodiment comprises n selection process procedures.

In the embodiment of the invention mentioned above, the central control unit CC assigns the individual base stations B1, . . . , Bn frequencies cyclically or pseudo-randomly in a coordinated manner. Within one base station, the frequencies are again distributed cyclically or pseudo-randomly to the individual terminals. This embodiment of the invention is distinguished by the fact that a relatively large number of frequencies are assigned to an individual terminal, and any interference which may possibly occur is thus distributed.

It can furthermore be provided that the second selection process is carried out in such a manner that a selection algorithm which is used by in each case two different base stations is different. The second selection process may relate to all the channels, or only to some of the channels. In particular, the selection algorithm is uncorrelated. This applies in particular to base stations which are not immediate neighbors, however, are in a mutual or common local interference area.

For example, in the method described above, it is possible to provide for, for example, useful information and/or signaling information to be transmitted at the same frequency from and to the terminals MS11 and MS21 (FIG. 4), on the one hand, and to and from two base stations B1 and B2 (FIG. 4) on the other hand. Due to the second selection procedures, regular collisions do not occur in these transmissions.

The invention also provides that at least one transmitting/receiving device of the base stations transmits to a terminal information which designates the parameters of the first and second selection processes. Examples of such parameters are a start value, that is to say, a frequency which is to be used first at the start of the selection process, or a so-called feed value for a random-number generator.

All the embodiments of the method according to the invention mentioned above are compatible with the GSM standard.

The switching system according to the invention, in particular a system control center, has a control unit (for example the central controller CC in FIG. 4) which has associated with it a control program which defines the method according to the invention. This control program is compatible with control programs of base station control units, and with control programs of the terminals.

It is possible to provide for a function of the control unit CC, namely the time-dependent permutation P1 of the frequencies, to be implemented in individual base stations B1, . . . , Bn as well. In this case, the permutations P1 and P21 as well as P22, P2n are connected directly one after the other.

I claim:

1. A method for establishing telecommunications links in a switching system, the method which comprises:

providing a first number of terminal devices;

providing a base station having a second number of transmitting/receiving devices assigned to the terminal devices, the first number being greater than the second number;

transmitting at least one of a useful information and a signaling information at different times and using a redundant coding, from the transmitting/receiving devices to a given terminal device of the first number of terminal devices in a first transmission cycle in time using a plurality of transmission frequencies specific to the transmitting/receiving devices;

subsequently interrupting a transmission from the transmitting/receiving devices to the given terminal device for a time period equivalent to a number of transmission periods obtained from a difference between the first number and the second number; and continuing the transmission from the transmitting/receiving devices to the given terminal device in a second transmission cycle in time after the time period has elapsed.

2. The method according to claim 1, wherein the plurality of the transmission frequencies are only a part of a number of transmission frequencies specific to the transmitting/receiving devices and available to the terminal devices.

3. The method according to claim 1, which comprises transmitting at least one of the useful information and the signaling information with at least one of the transmitting/receiving devices, the at least one of the transmitting/receiving devices using more than one transmission frequency of the plurality of transmission frequencies.

4. The method according to claim 1, which comprises transmitting, with the given terminal device, at least one of the useful information and the signaling information with at least the one transmission frequency of the plurality of transmission frequencies in the time period in which the transmission from the transmitting/receiving device to the given terminal device is interrupted.

5. The method according to claim 1, which comprises interrupting a transmission from the given terminal device in the time period in which the transmission from the transmitting/receiving device to the given terminal device is interrupted.

6. The method according to claim 5, which comprises switching off a receive operation of the given terminal device in the time period in which the transmission from the transmitting/receiving device to the given terminal device is interrupted.

7. The method according to claim 1, which comprises transmitting from at least one of the transmitting/receiving devices to the given terminal device information for designating at least one of the plurality of transmission frequencies to be used by the given terminal device.

8. The method according to claim 1, which comprises transmitting from at least one of the transmitting/receiving devices to the given terminal device information for designating at least one of the plurality of transmission frequencies not to be used by the given terminal device.

9. The method according to claim 1, which comprises transmitting, from at least one of the transmitting/receiving devices to the given terminal device, information for designating a time for transmitting at least one of the useful information and the signaling information with the given terminal device.

10. The method according to claim 1, which comprises transmitting, from at least one of the transmitting/receiving devices to the given terminal device, information for designating a time for interrupting a transmission from the given terminal device.

11. The method according to claim 1, which comprises transmitting, from at least one of the transmitting/receiving devices to the given terminal device, information for designating a time at which the given terminal device is switched to receive.

12. The method according to claim 1, which comprises transmitting, from at least one of the transmitting/receiving devices to the given terminal device, information for designating a time at which the given terminal device is not switched to receive.

13. The method according to claim 1, which comprises:
checking a quality of a transmission of at least one of the useful information and the signaling information transmitted from one of the transmitting/receiving devices to one of the terminal devices; and
reducing the time period in which the transmission of at least one of the useful information and the signaling information from the transmitting/receiving device to the given terminal device is interrupted, if the quality of the transmission is less than a given threshold value.

14. The method according to claim 1, wherein the first number of terminal devices and the base station are provided in a mobile communications system.

15. A method for establishing telecommunications links in a switching system, the method which comprises:
providing a first number of terminal devices;
providing a base station having a second number of transmitting/receiving devices assigned to the terminal devices, the first number being greater than the second number;
selecting transmission frequencies from a range of transmission frequencies, by one of cyclically and pseudo-randomly assigning, in a first selection process, the transmission frequencies to the base station and to further base stations, and, in a second selection process within a respective one of the base station and the further base stations, one of cyclically and pseudo-randomly assigning the transmission frequencies to the terminal devices; and
transmitting at least one of a useful information and a signaling information at different times and using a redundant coding, from the transmitting/receiving devices to a given terminal device of the first number of terminal devices in a first transmission cycle in time, wherein at least one transmission frequency is specific to each one of the transmitting/receiving devices;
subsequently interrupting a transmission from the transmitting/receiving devices to the given terminal device for a time period equivalent to a number of transmission periods obtained from a difference between the first number and the second number; and
continuing the transmission from the transmitting/receiving devices to the given terminal device in a second transmission cycle in time after the time period has elapsed.

16. A switching system for establishing telecommunications links, comprising:
a first number of terminal devices;
a base station having a second number of transmitting/receiving devices assigned to said terminal devices, the first number being greater than the second number;
a control unit connected to said base station and programmed to perform in combination with said base station and said terminal devices the steps of:
transmitting at least one of a useful information and a signaling information at different times and using a redundant coding, from said transmitting/receiving devices to a given terminal device of said terminal devices in a first transmission cycle in time using a plurality of transmission frequencies specific to said transmitting/receiving devices;
subsequently interrupting a transmission from said transmitting/receiving devices to said given terminal device for a time period equivalent to a number of transmission periods obtained from a difference between the first number and the second number; and
continuing the transmission with said transmitting/receiving devices to said given terminal device in a second transmission cycle in time after the time period has elapsed.

17. A switching system for establishing telecommunications links, comprising:
a base station having a plurality of transmitting/receiving devices for communicating with a first number of terminal devices, said plurality of said transmitting/receiving devices being present in a second number;
a control unit connected to said base station and programmed to perform in combination with said base station the steps of:
transmitting at least one of a useful information and a signaling information at different times and using a redundant coding, from said plurality of transmitting/receiving devices to a terminal device in a first transmission cycle in time using a plurality of transmission frequencies specific to said transmitting/receiving devices;
subsequently interrupting a transmission from said transmitting/receiving devices to the terminal device for a time period, the time period being equivalent to a number of transmission periods obtained from a difference between the first number and the second number when the first number is greater than the second number; and
continuing the transmission with said transmitting/receiving devices to the terminal device in a second transmission cycle in time after the time period has elapsed.

* * * * *